Patented Nov. 18, 1941

2,263,520

UNITED STATES PATENT OFFICE 2,263,520

METHOD OF MAKING SINTERED HARD METAL ALLOYS

Johan Romp, Eindhoven, Netherlands, assignor, by mesne assignments, to Hartford National Bank and Trust Company, Hartford, Conn., as trustee No Drawing. Application November 7, 1939, Serial No. 303,309. In Germany November 4, 1938

3 Claims. (Cl. 75—137)

In the manufacture of hard metal alloys by sintering it is often desirable that the density of the material should be increased as much as possible since such materials have to meet high requirements as to the mechanical properties. For this purpose it has been suggested to carry out the sintering process in a suitable mold with simultaneous application of pressure. When manufacturing bodies whose shape is such that they can be formed simultaneously in a mold by molding this may be obtained by making the mold from material having a sufficient strength at a high temperature. The mold materials generally used for this purpose have, however, inter alia the disadvantage that the mold can frequently be used once only; with bodies of particularly involved shape which cannot be formed by molding simultaneously it is necessary to shape it into the final form by mechanical operation subsequent to molding and prior to sintering. It is obvious that in this latter case there can be no question of simultaneous molding and sintering in a mold for the purpose of obtaining a high density.

This invention has for its object to remove these difficulties and this result is obtained by heating the previously shaped body, in a sintering manner and, for the purpose of increasing the density, then increasing the pressure of the gaseous atmosphere, preferably reducing atmosphere, of the surroundings with continued heating.

The increased pressure is preferably maintained even during cooling to avoid any risk that, when the gaseous pressure is decreased while the body is still hot and slightly plastic, the effect of the invention may be influenced detrimentally.

In carrying out the method according to the invention the gaseous pressure should not be increased until the body, due to the sintering heating, has obtained such a density that an increase in gaseous pressure according to the invention can bring about a further increase in density.

The invention makes it possible to heat bodies of simple as well as bodies of very involved shape in a sintering manner under pressure without the use of a highly refractory mold material. According to the invention a number of such bodies may be subjected to this operation separately or simultaneously.

It has been suggested to sinter bodies formed from a hard metal alloy at a gaseous pressure exceeding 1 atmosphere but this alone does not ensure the effect of the invention because, as explained above, I increase the gaseous pressure only after the material of the body has attained such a density that the gas can practically no longer penetrate into the interior of the body. This increase in density may be obtained by sintering the material at a low pressure, for instance below about 1 atmosphere. Any hollow spaces that may still be present in the body are reduced by the increased pressure treatment according to the invention with the result that the specific weight or density of the body is increased.

*Example I*

A mixture of 94% by weight of tungsten carbide (WC) and 6% by weight of cobalt is molded in a mold at a pressure of 1000 atmospheres at ordinary temperature. The body thus formed is then sintered for about 1 hour at 1450° C. under atmospheric pressure in a mixture of 85% nitrogen and 15% hydrogen. The specific weight of the body has then become equal to 14.5. On continued heating for 15 minutes at 1450° C. in the gas mixture while increasing the pressure of the gaseous mixture to a high value, for instance 50 atmospheres, and subsequent cooling at an increased pressure it is found that the specific weight has increased up to 14.85. The material thus obtained is particularly suited for drawing dies.

*Example II*

A pulverulent mixture of 79% by weight of tungsten carbide (WC), 15% by weight of titanium carbide (TiC) and 6% by weight of cobalt is molded in a mold at a pressure of 3000 atmospheres at ordinary temperature and then sintering is effected at 850° C. for about 1 hour. Bodies of the desired shape are made by mechanical operation from the material thus pre-sintered. Sintering then ensures at about 1500° C. for about 1 hour in hydrogen at atmospheric pressure. The specific weight of the material has thus become equal to 11.1. If the body is then subjected to a further heating at 1500° C. in a gas mixture of 85% nitrogen and 15% hydrogen with the use of a pressure, for example, of 50 atmospheres for 15 minutes and is then cooled under this high pressure, the specific weight is increased to 11.45.

The heating under pressure may be effected in a furnace which is similar to the type illustrated and described in the British Patent #452,503.

What I claim is:

1. A method of making a body of high density from a hard metal alloy, comprising the steps of forming the alloy into the body, heating the body in an atmosphere of a low pressure gaseous mixture to thereby sinter the alloy and give the body a density at which the gaseous mixture no longer penetrates into the body, and heating the sintered body in a gaseous atmosphere while increasing the pressure of the atmosphere to thereby further increase the density of the body.

2. A method of making a body of high density from a hard metal alloy, comprising the steps of forming a body of the alloy, heating the body in an atmosphere of a low pressure gaseous mixture to thereby sinter the alloy and give the body a density at which the gaseous mixture no longer penetrates into the body, heating the body in a gaseous atmosphere while increasing the pressure of the gaseous atmosphere to thereby further increase the density of the body, and cooling the body while it remains in the atmosphere of increased pressure.

3. A method of making a body of high density from a hard metal alloy, comprising the steps of forming a body of the alloy, heating the body in an atmosphere of a low pressure gaseous mixture to thereby sinter the alloy and give the body a density at which the gaseous mixture no longer penetrates into the body, and heating the sintered body in a gaseous atmosphere while increasing the pressure of the gaseous atmosphere to about 50 atmospheres to thereby further increase the density of the body.

JOHAN ROMP.